United States Patent
Oshiro

(10) Patent No.: US 11,191,022 B2
(45) Date of Patent: Nov. 30, 2021

(54) TRANSMISSION APPARATUS

(71) Applicants: Kabushiki Kaisha Toshiba, Tokyo (JP); Toshiba Electronic Devices & Storage Corporation, Tokyo (JP)

(72) Inventor: Masayoshi Oshiro, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/802,333

(22) Filed: Feb. 26, 2020

(65) Prior Publication Data
US 2021/0068057 A1    Mar. 4, 2021

(30) Foreign Application Priority Data
Sep. 3, 2019  (JP) .............................. JP2019-160570

(51) Int. Cl.
*H04W 52/02* (2009.01)
*H04W 4/80* (2018.01)
*H04W 76/10* (2018.01)
*H04W 76/30* (2018.01)

(52) U.S. Cl.
CPC ......... *H04W 52/0235* (2013.01); *H04W 4/80* (2018.02); *H04W 76/10* (2018.02); *H04W 76/30* (2018.02)

(58) Field of Classification Search
None
See application file for complete search history.

(56) References Cited

U.S. PATENT DOCUMENTS

| 6,175,558 | B1 | 1/2001 | Miya |
| 6,216,012 | B1 * | 4/2001 | Jensen ................. H03G 3/3042 455/553.1 |
| 6,397,077 | B1 * | 5/2002 | Jensen ................. H03G 3/3042 455/551 |
| 6,466,165 | B2 | 10/2002 | Obayashi |
| 6,650,292 | B2 | 11/2003 | Obayashi |
| 6,750,817 | B2 | 6/2004 | Obayashi |
| 8,649,741 | B2 * | 2/2014 | Iijima ................ H03K 17/6221 455/83 |
| 8,873,662 | B2 * | 10/2014 | Sesia .................... H04W 52/028 375/267 |
| 9,722,771 | B2 * | 8/2017 | Banowetz ................ H03G 3/00 |

(Continued)

FOREIGN PATENT DOCUMENTS

| JP | H04-274625 A | 9/1992 |
| JP | 2863993 B2 | 3/1999 |
| JP | 3719954 B2 | 11/2005 |

*Primary Examiner* — Pablo N Tran
(74) *Attorney, Agent, or Firm* — Allen & Overy, LLP

(57) ABSTRACT

A transmission apparatus according to an embodiment includes a power amplifier, an antenna switch, and a control circuit. The power amplifier amplifies and outputs a transmission signal. The antenna switch switches, among at least two or more antennas, an antenna configured to output the transmission signal from the power amplifier. The control circuit performs output power control of the power amplifier when the control circuit outputs to the antenna switch a switching control signal for switching the antenna.

4 Claims, 6 Drawing Sheets

(56) References Cited

U.S. PATENT DOCUMENTS

2005/0227643 A1* 10/2005 Brindle ................ H03G 3/3042
                                                      455/127.1
2013/0149975 A1*  6/2013 Yu ........................ H04B 7/0868
                                                       455/78

* cited by examiner

TRANSMISSION APPARATUS

CROSS-REFERENCE TO RELATED APPLICATION

This application is based upon and claims the benefit of priority from the prior Japanese Patent Application No. 2019-160570 filed on Sep. 3, 2019; the entire contents of which are incorporated herein by reference.

FIELD

Embodiments described herein relate generally to a transmission apparatus.

BACKGROUND

In recent years, BLE (Bluetooth low energy) has been developed as a next standard of Bluetooth (registered trademark) for proximity wireless communication. BLE repeatedly connects and disconnects frequently to suppress power consumption.

BLE switches an antenna switch at high speed in 1 microsecond or 2 microseconds within one packet. In this case, there has been a problem that a spurious due to discontinuity of high-speed switching is generated because the antenna switch is switched with a signal transmitted.

DETAILED DESCRIPTION

A transmission apparatus according to an embodiment includes a power amplifier, an antenna switch, and a control circuit. The power amplifier amplifies and outputs a transmission signal. The antenna switch switches, among at least two or more antennas, an antenna configured to output the transmission signal from the power amplifier. The control circuit performs output power control of the power amplifier when the control circuit outputs to the antenna switch a switching control signal for switching the antenna.

The embodiment will be described in detail below with reference to the drawings.

First, a configuration of a transmission apparatus according to a first embodiment will be described with reference to FIG. 1.

Figure 1:
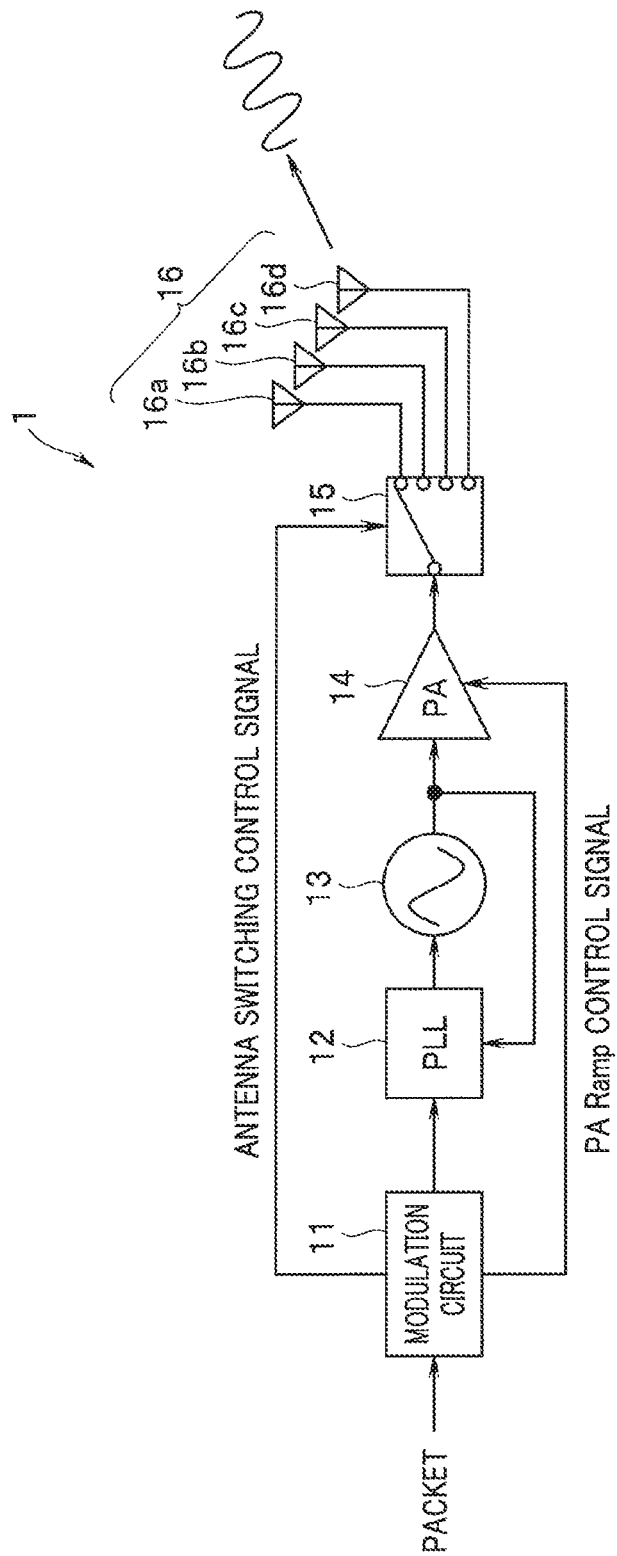
FIG. 1 is a block diagram illustrating an example of a transmission apparatus according to a first embodiment.

FIG. 1 is a block diagram illustrating an example of the transmission apparatus according to the first embodiment.

A transmission apparatus 1 is configured to include a modulation circuit 11, a PLL (phase locked loop) circuit 12, a TXVCO circuit (transmission voltage-controlled oscillator circuit) 13, a power amplifier 14, an antenna switch 15, and a plurality of antennas 16. Note that the transmission apparatus 1 is configured to include, but not limited to, four antennas 16a to 16d. The transmission apparatus 1 may be configured to include two antennas, three antennas, or five or more antennas.

A packet is inputted to the modulation circuit 11 constituting a control circuit. The modulation circuit 11 FSK—modulates the packet P, and outputs the modulated packet P to the PLL circuit 12. The modulation circuit 11 outputs an antenna switching control signal (ANT CNT) for switching the antenna 16 to the antenna switch 15. Further, the modulation circuit 11 outputs a PA Ramp control signal for performing Ramp control (output power control) of the power amplifier 14 in synchronization with the switching of the antenna 16.

The PLL circuit 12 outputs transmission data corresponding to the packet P to the TXVCO circuit 13 and outputs to the TXVCO circuit 13 a PLL signal generated by phase-locking an oscillation signal returned from the TXVCO circuit 13.

The TXVCO circuit 13 generates an oscillation signal based on the PLL signal. The TXVCO circuit 13 generates a transmission signal Tx having a predetermined frequency based on the transmission data from the PLL circuit 12 and the generated oscillation signal, and outputs the transmission signal Tx to the power amplifier 14.

The power amplifier 14 amplifies the transmission signal Tx, and outputs the amplified transmission signal Tx to the antenna switch 15. The power amplifier 14 performs Ramp control that is synchronized with the switching of the antenna 16 in response to the PA Ramp control signal from the modulation circuit 11.

The antenna switch 15 switches the antenna to be connected based on the antenna switching control signal. As a result, the transmission signal Tx is transmitted from the connected antenna 16.

Figure 2:
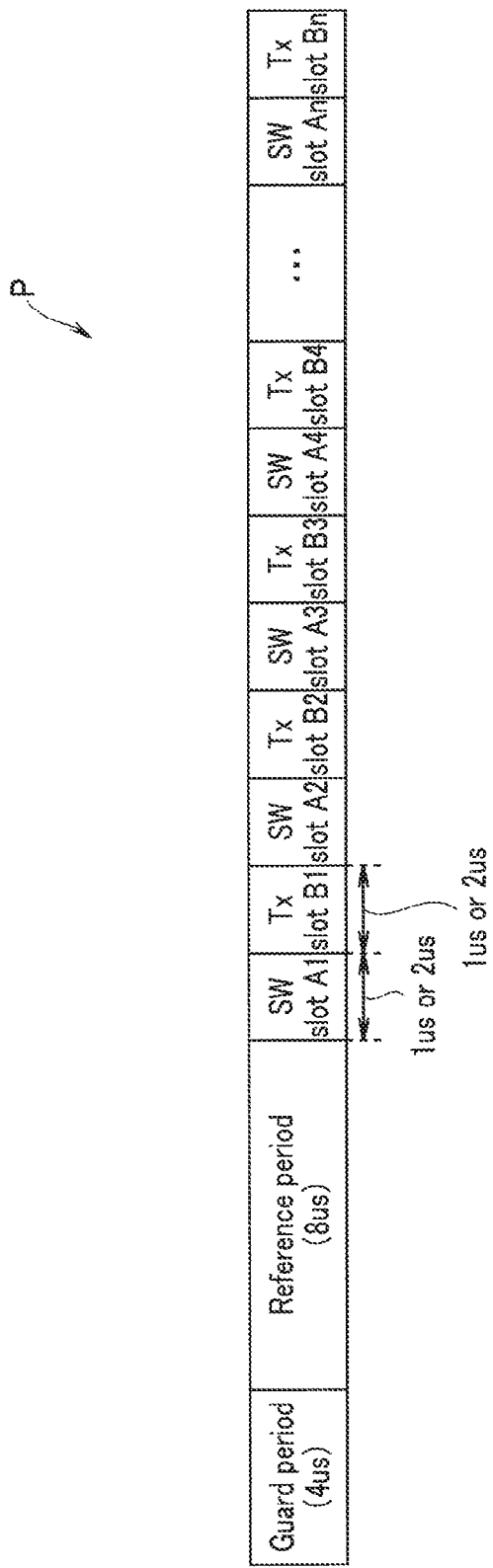
FIG. 2 is a diagram illustrating an example of a packet structure according to the first embodiment.

FIG. 2 is a diagram illustrating an example of a packet structure according to the first embodiment.

The packet P is configured to include a Guard period of 4 microseconds and a Reference period of 8 microseconds. Then, antenna switching is alternated with transmission of a transmission signal Tx. More specifically, the packet is configured to include an SW slot A1, a Tx slot B1, an SW slot A2, a Tx slot B2, . . . , an SW slot An, and a Tx slot Bn of 1 microsecond or 2 microseconds after the Reference period.

The SW slot A1, the SW slot A2, and the like are each a predetermined switching period during which the antenna 16 is switched, and the Tx slot B1, the Tx slot B2, and the like are each a period during which the transmission signal Tx is transmitted from the switched antenna 16.

In the present embodiment, the antenna 16 is switched to the antenna 16a in the period SW slot A1, and a transmission signal Tx is transmitted from the antenna 16a in the period Tx slot B1. Then, the antenna 16 is switched to the antenna 16b in the period SW slot A2, and a transmission signal Tx is transmitted from the antenna 16b after the switching in the period Tx slot B2.

Figure 3:
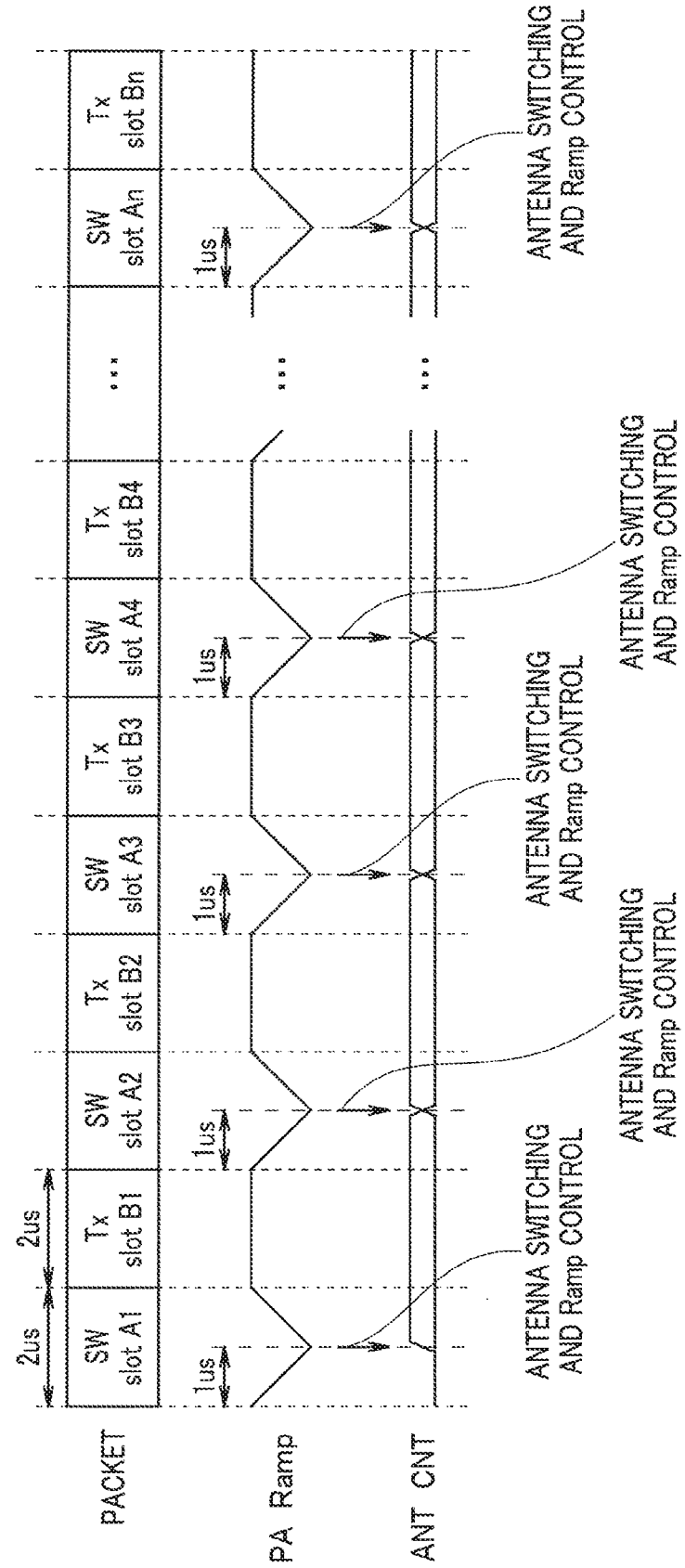
FIG. 3 is a diagram for describing an example of antenna switching and Ramp control of a power amplifier according to the first embodiment.

FIG. 3 is a diagram for describing an example of antenna switching and Ramp control of a power amplifier according to the first embodiment. In FIG. 3, a switching period and a transmission period are each 2 microseconds.

As illustrated in FIG. 3, the modulation circuit 11 makes an antenna switching control signal (ANT CNT) effective and switches the antenna switch 15 at a time of 1 microsecond from a head of an SW slot A1. Further, the modulation circuit 11 outputs a PA Ramp control signal for powering down an output power of the power amplifier 14 in 1 microsecond from the head of the SW slot A1.

The modulation circuit 11 switches the antenna switch 15, that is, switches an antenna configured to transmit a transmission signal Tx, and then outputs a PA Ramp control signal for powering up an output power of the power amplifier 14. The modulation circuit 11 also performs similar control to the control in the SW slot A1 in a switching period of another antenna.

Since the antenna 16 is switched at a center of the switching period in the present embodiment, the modulation circuit 11 outputs the PA Ramp control signal such that the output power of the power amplifier 14 reaches a minimum at the center of the switching period. Therefore, the output power of the power amplifier 14 is powered down in 1 microsecond from a head of the switching period, after switching the antenna 16, and the output power of the power amplifier 14 is powered up in 1 microsecond in a latter half of the switching period.

Although the modulation circuit 11 switches the antenna 16 at the center of the switching period in the present embodiment, the present invention is not limited to this. For example, the modulation circuit 11 may switch the antenna 16 at any timing within the switching period.

Figure 4:
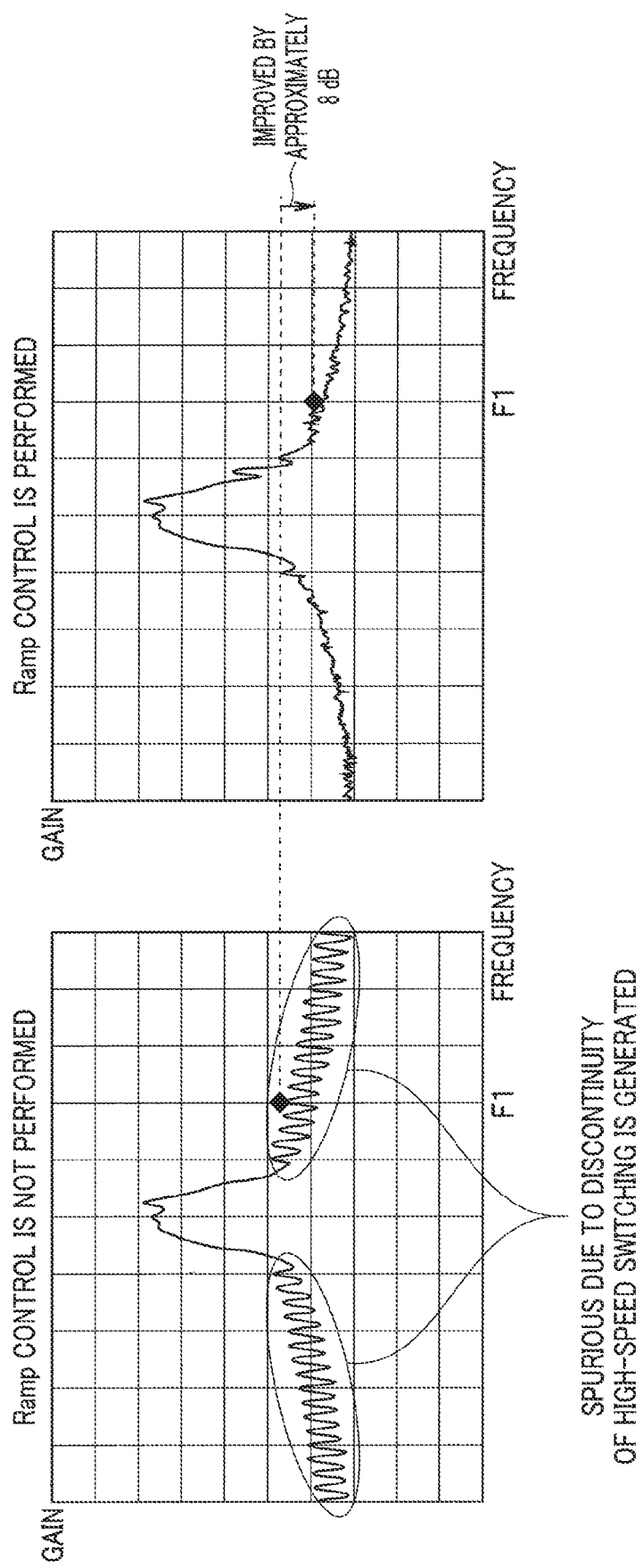
FIG. 4 is a diagram for describing an effect due to Ramp control according to the first embodiment.

FIG. 4 is a diagram for describing an effect due to Ramp control according to the first embodiment. If the Ramp control is not performed, a spurious due to discontinuity of high-speed switching of the antenna 16 is generated. On the other hand, if the Ramp control in the present embodiment is performed, generation of a spurious due to discontinuity of high-speed switching of the antenna 16 is suppressed.

In the transmission apparatus 1 according to the present embodiment, gain is improved by approximately S dB at a frequency F1 because the generation of the spurious is suppressed.

In the transmission apparatus according to the present embodiment, Ramp control of the power amplifier 14 is performed a plurality of times in synchronization with each switching of the antenna within one packet. As a result, generation of a spurious due to discontinuity of high-speed switching of a plurality of antennas can be suppressed.

Second Embodiment

Next, a second embodiment will be described.

Figure 5:
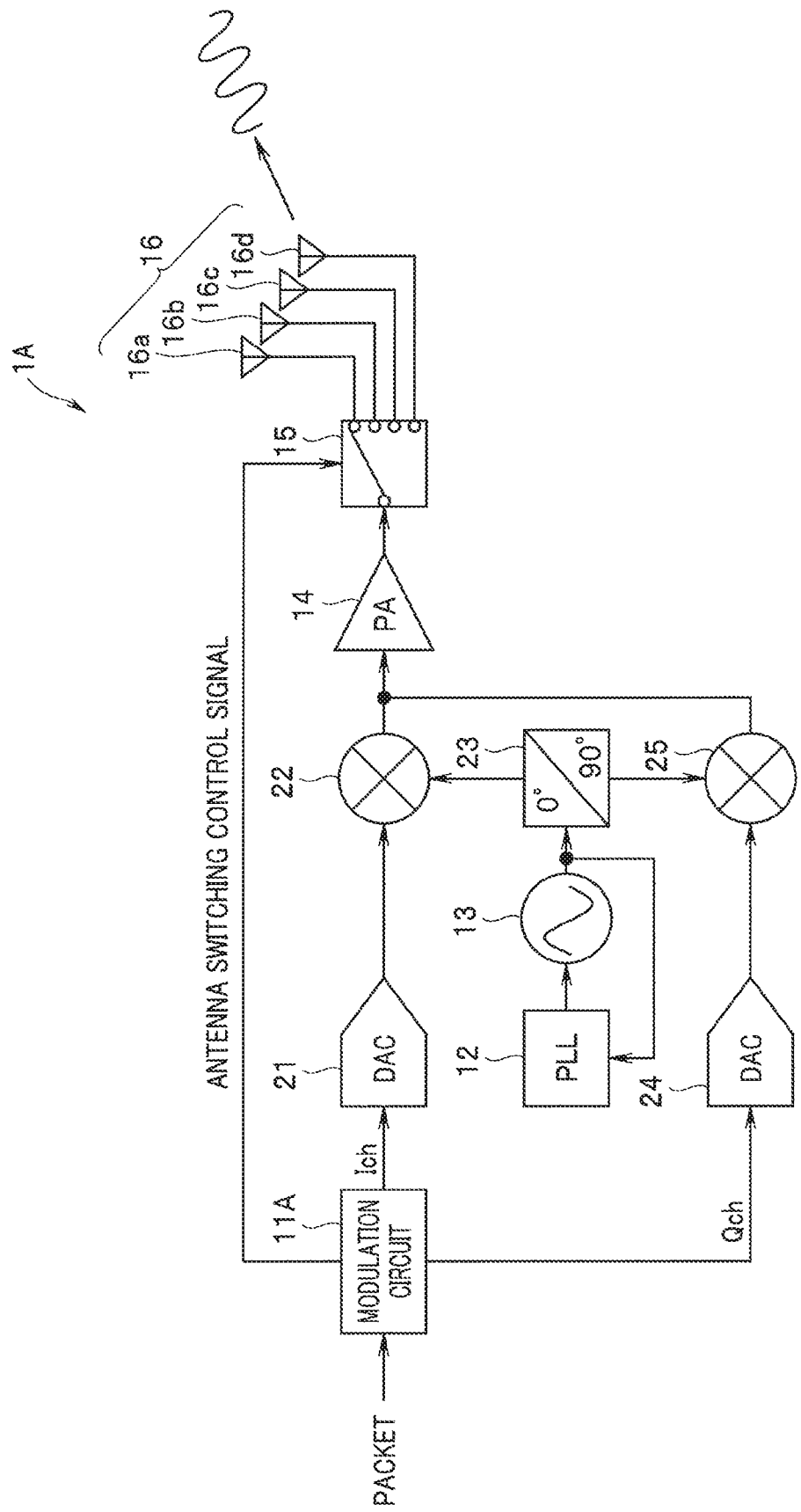
FIG. 5 is a block diagram illustrates an example of a transmission apparatus according to a second embodiment and FIG. 6 is a diagram for describing an example of antenna switching and IQ complex amplitude control according to the second embodiment.

FIG. 5 is a block diagram illustrating an example of a transmission apparatus according to the second embodiment. Note that similar components to the components illustrated in FIG. 1 are respectively assigned the same reference numerals to omit description in FIG. 5.

A transmission apparatus 1A is configured to include digital-to-analog converters (hereinafter referred to as DACs) 21 and 24, mixers 22 and 25, and a phase shifter 23 in addition to the components illustrated in FIG. 1. The transmission apparatus 1A is configured to include a modulation circuit 11A instead of the modulation circuit 11 illustrated in FIG. 1.

The modulation circuit 11A constituting a control circuit outputs to an antenna switch 15 an antenna switching control signal for controlling switching of an antenna 16. The modulation circuit 11A generates an I signal having an in-phase component and a Q signal having an orthogonal component of a carrier wave based on an inputted packet. The modulation circuit 11A outputs the I signal to the DAC 21, and outputs the Q signal to the DAC 24. The modulation circuit 11A performs IQ complex amplitude control of the I signal and the Q signal in synchronization with the switching of the antenna 16.

The DAC 21 outputs the I signal, which has been subjected to analog conversion, to the mixer 22. The DAC 24 outputs the Q signal, which has been subjected to analog conversion, to the mixer 25.

The phase shifter 23 generates an in-phase oscillation signal and an oscillation signal, which has been shifted in phase by 90 degrees, from a TXVCO circuit 13. The phase shifter 23 outputs the in-phase oscillation signal to the mixer 22, and outputs the oscillation signal, which has been shifted by 90 degrees, to the mixer 25.

The mixer 22 mixes the I signal as an analog signal and the in-phase oscillation signal, and outputs their mixture to a power amplifier 14. The mixer 25 mixes the Q signal as an analog signal and the oscillation signal, which has been shifted by 90 degrees, and outputs their mixture to the power amplifier 14. Note that respective outputs of the mixers 22 and 25 are added, and are inputted to the power amplifier 14. Other components are similar to the components in the first embodiment.

Figure 6:
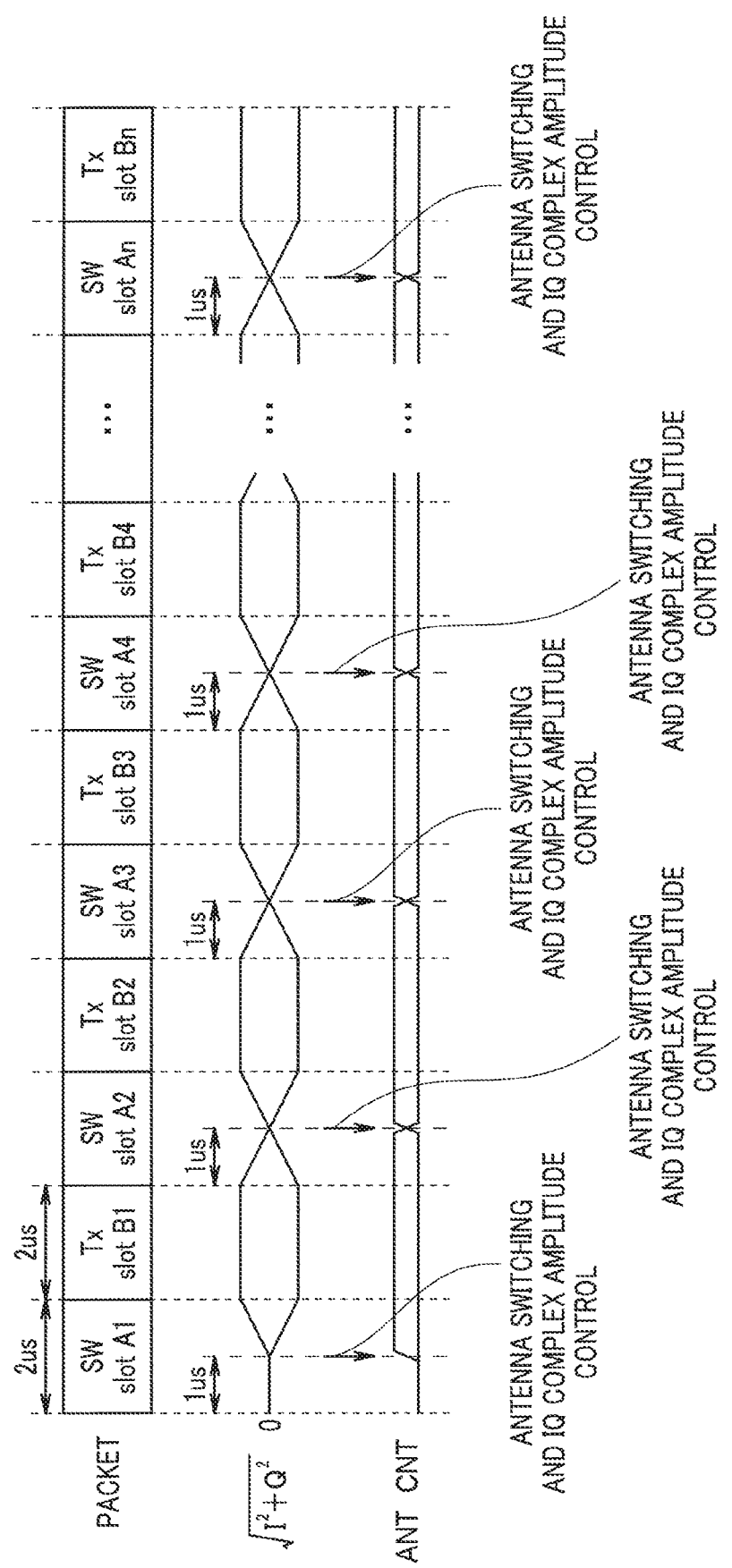

Then, antenna switching and IQ complex amplitude control in the present embodiment will be described with reference to FIG. 6. FIG. 6 is a diagram for describing an example of antenna switching and IQ complex amplitude control according to the second embodiment.

The modulation circuit 11A makes an antenna switching control signal (ANT CNT) effective and switches the antenna switch 15 at a time of 1 microsecond from a head of an SW slot A1. At this time, the modulation circuit 11A does not control respective IQ complex amplitudes of an I signal and a Q signal. The IQ complex amplitude is represented by $\sqrt{(I^2+Q^2)}$, where I and Q are respectively the amplitudes of the I signal and the Q signal. The modulation circuit 11A performs control to increase the IQ complex amplitude of each of the I signal and the Q signal to a predetermined amplitude value after switching the antenna switch 15. Then, the modulation circuit 11A performs control to maintain the IQ complex amplitude at a predetermined amplitude value in a period of a Tx slot B1.

The modulation circuit 11A performs control to decrease the IQ complex amplitude in 1 microsecond from ahead of an SW slot A2. Further, the modulation circuit 11A makes an antenna switching control signal (ANT CNT) effective and switches the antenna switch 15 at a time of 1 microsecond from the head of the SW slot A2. The modulation circuit 11A performs control to increase the IQ complex amplitude after switching the antenna switch 15. The modulation circuit 11A also performs similar control to the control in the SW slot A2 in a switching period of another antenna.

In the present embodiment, the transmission apparatus 1 performs IQ complex amplitude control a plurality of times in synchronization with antenna switching within one packet P. As a result, the transmission apparatus 1A suppresses generation of a spurious due to discontinuity of high-speed switching of the antenna 16, as in the first embodiment.

From the foregoing, the transmission apparatus according to the present embodiment can suppress generation of a spurious due to discontinuity of high-speed switching of a plurality of antennas, as in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission apparatus comprising:
a power amplifier configured to amplify and output a transmission signal;
an antenna switch configured to switch, among at least two or more antennas, an antenna configured to output the transmission signal from the power amplifier; and
a control circuit configured to perform output power control of the power amplifier when the control circuit outputs to the antenna switch a switching control signal for the antenna,
wherein the control circuit outputs the switching control signal to the antenna switch to switch the antenna at a center of a predetermined switching period.

2. The transmission apparatus according to claim 1, wherein the control circuit powers down an output of the power amplifier until the control circuit switches the antenna within the predetermined switching period and powers up the output of the power amplifier after switching the antenna within the predetermined switching period.

3. A transmission apparatus comprising:
a power amplifier configured to amplify and output a transmission signal;
an antenna switch configured to switch, among at least two or more antennas, an antenna configured to output the transmission signal from the power amplifier; and
a control circuit configured to perform output power control of the power amplifier when the control circuit outputs to the antenna switch a switching control signal for switching the antenna,
wherein the control circuit performs the switching of the antenna and the output power control of the power amplifier a plurality of times within one packet.

4. The transmission apparatus according to claim 1, wherein the control circuit performs the output power control of the power amplifier in synchronization with the switching of the antenna.

* * * * *